United States Patent [19]

Krummey et al.

[11] Patent Number: 5,216,500
[45] Date of Patent: Jun. 1, 1993

[54] SIMULTANEOUSLY RECORDING OF VIDEO IMAGE AND MICROSCOPE STAGE POSITION DATA

[75] Inventors: Michael J. Krummey, Madison, Wis.; Richard J. Lee, Murrysville, Pa.; James E. Nesbitt; William J. Powers, Jr., both of Pittsburgh, Pa.; Alfred J. Schwoeble, Monroeville, Pa.

[73] Assignee: RJ Lee Group, Inc., Monroeville, Pa.

[21] Appl. No.: 730,084

[22] Filed: Jul. 15, 1991

[51] Int. Cl.⁵ .............................................. H04N 7/18
[52] U.S. Cl. ...................................................... 358/93
[58] Field of Search ................. 358/93, 108, 107, 210, 358/183

[56] References Cited

U.S. PATENT DOCUMENTS

| | | | |
|---|---|---|---|
| 3,705,271 | 12/1972 | DeBell et al. | 179/100.2 |
| 3,731,282 | 5/1973 | Dancis et al. | 340/172.5 |
| 4,012,112 | 3/1977 | Masterson | 350/90 |
| 4,422,105 | 12/1983 | Rodesch et al. | 358/903 |
| 4,627,009 | 12/1986 | Holmes et al. | 364/559 |
| 4,672,559 | 6/1987 | Jansson et al. | 358/93 X |
| 4,769,698 | 9/1988 | Ledley et al. | 358/93 |
| 4,824,229 | 4/1989 | Narita et al. | 350/531 |
| 4,847,710 | 7/1989 | Morioka et al. | 360/72.2 |
| 4,884,878 | 12/1989 | Arenal et al. | 350/429 |

Primary Examiner—Victor R. Kostak
Attorney, Agent, or Firm—Webb, Burden, Ziesenheim & Webb

[57] ABSTRACT

Method of making an examination of a specimen by use of a microscope comprises during a first session, conducting a microscopic examination of a specimen by manipulation of the specimen stage while video recording the examination and during a subsequent session, replaying the recording to produce a video image, and manipulating the stage with reference to the video image so that the image observed by use of the microscope is substantially the same as the video image.

12 Claims, 4 Drawing Sheets

SIMULTANEOUSLY RECORDING OF VIDEO IMAGE AND MICROSCOPE STAGE POSITION DATA

FIELD OF THE INVENTION

This invention relates to the field of microscopy including optical, scanning electron, transmission electron and other forms of microscopy wherein multiple image fields are captured by video camera and displayed by a video monitor.

BACKGROUND OF THE INVENTION

When a large number of features or areas of one or more specimens are to be microscopically viewed, analyzed and compared, data collection and preservation is an enormous task. Image data can be digitized and manipulated with computers, but digitization is slow and expensive. Moreover, what is often needed most is not the recorded image of a feature in a micrograph but the ability to relocate a feature for further examination under different conditions or with different microscopic techniques.

SUMMARY OF THE INVENTION

It is an advantage according to this invention to provide a system and a method for video recording a microscope examination session to enable the rapid and effective relocation of microscopic features in a subsequent session.

It is a further advantage according to this invention to provide a system and a method for simultaneously video recording a microscope examination session, recording the voice comments of the microscopist and recording digitally encoded information such as stage position, focus, lighting information or the like using consumer grade video recording equipment.

It is a further advantage according to this invention to simultaneously record and recover digitally encoded data along with audio and video data using consumer grade video taping equipment.

Briefly according to this invention there is provided a system and a method of making an examination of a specimen by use of a microscope. The first step comprises mounting the specimen on a standard specimen holder. Then during a first session, the specimen holder is placed on a specimen stage at a datum position and the specimen stage is moved to a home position. As used here, "home" implies a reproducible reference position. In practice, this might involve manually moving to one or more fiducial marks or to one or more readily identified features and resetting the origin of the coordinate system for the stage. Then the microscopic examination of the specimen is conducted by manipulation of the specimen stage and specimen holder thereon while video recording the examination session. In a subsequent session, the specimen holder is placed on a specimen stage at the datum position and the stage is moved to a home position. The previously recorded session is displayed on a monitor and the stage is manipulated with reference to the video image displayed on the monitor so that the image observed under the microscope is substantially the same as the video image. The subsequent session need not be conducted on the same microscope so long as the stages for manipulating the specimen are compatible. Compatible stages are stages having, for example, coordinate systems which can be related to each other numerically and in which the range of the movement for the primary stage does not exceed the range for the secondary microscope stage. According to a preferred embodiment, the first session is conducted with an optical microscope and the subsequent session is conducted on an electron microscope having a stage compatible with that of the stage on the optical microscope.

According to another preferred embodiment of this invention, the subsequent session is video recorded, as was the first session, for use in yet a later session. In this way, manual or automatic tracking in the subsequent session can be suspended while new areas of interest are investigated and recorded and then the subsequent session can resume tracking the original session from the point of suspension.

In a preferred system and method according to this invention, the microscopic examination of the specimen during the first session is made by manipulation of the specimen stage while video recording the examination and simultaneously recording encoded digital position signals indicative of stage positioning in the audio band of the video signal along with the normal analog voice signal. During a subsequent session, the specimen stage is caused to automatically track the earlier session replayed and displayed on a monitor. The automatic tracking is effected by recovering the encoded position data, and using the recovered position data as commands to a servo drive. Thus, the image observed under the microscope is substantially the same as the video image displayed upon the monitor.

A preferred subcombination of the above-described systems and methods comprises simultaneously recording a signal indicative of digital control data, and signals comprising the sound and video picture data of a television signal with consumer grade video recording equipment. The digital control data is encoded into a signal at audio frequencies between a lower threshold frequency and an upper threshold frequency. The audio input signal is filtered by a low-pass filter to remove frequencies above the lower threshold frequency. The encoded digital control data signal and the filtered audio signals are then combined and recorded by a consumer grade video recorder (for example, VHS standard video tape recorder). The digital data is recovered as follows: The audio portion of the replayed video is passed into two channels, one having a high pass filter to pass the digital data and the other having a low pass filter to pass the voice data.

BRIEF DESCRIPTION OF THE DRAWINGS

Further features and other objects and advantages will become apparent from the following detailed descriptions made with reference to the drawings in which.

DESCRIPTION OF THE PREFERRED EMBODIMENTS

Figure 1:
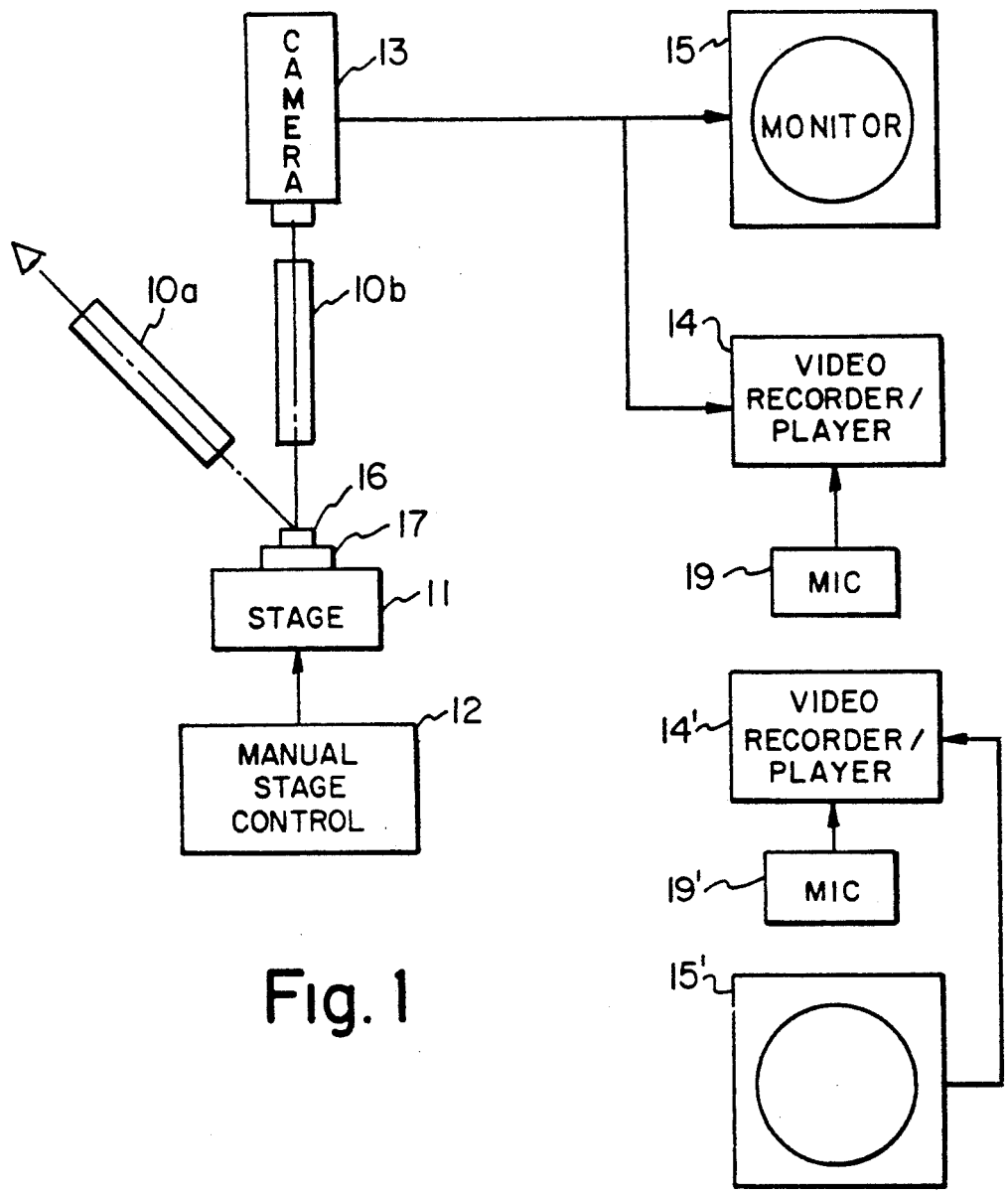
FIG. 1 is a schematic illustration of the system for the practice of one embodiment of this invention.

Referring now to FIG. 1, there is shown the apparatus required for the video recording of an optical microscope session. Below the optical microscope 10a is a specimen stage 11 which is normally moveable in three axial directions (x, y and z) and about three axes (spin, bank and tilt: s, b and t). A manual control 12 is provided for manipulating the specimen stage through the available degrees of freedom (six, if including x, y, z, s, b and t). The microscope, in a preferred embodiment, is a stereo microscope; that is, one that has converging binocular lenses such that the viewer sees a three-dimensional image. A video camera 13 is mounted over a second simple microscope 10b which is arranged to be directed at and focused on the same field as the first microscope. The video camera is connected to a video recorder 14 operated in the record mode and a TV monitor 15. The video recorder can be a standard consumer VHS video tape recorder. Herein reference is made to video tape recorders. However, this invention is not limited to the particular recording media used by the video recorder. It is an advantage that both the audio and video signals are recorded and read with a single (recording-pickup) head. In other words, separate recording heads are not required for video and audio signals. The video recorder is provided with a microphone input 19 that enables the recording of oral comments along with video images. The specimen 16 is mounted to a specimen platform 17 where it is fixed until there in no longer a need to reexamine the specimen. The specimen platform is keyed to the specimen stage so that it can be replaced in the exact same position (datum position) on the specimen stage after being removed. The specimen stage is designed such that it can be easily brought to a home position for all degrees of freedom. The home position is a predetermined position along and about the three axes of the stage.

Substantially the same equipment can be used for a subsequent optical microscope session made with reference to the video recorded first session. The video recorder is operated in the play mode, however, and the video camera is not operated. The subsequent session need not be and very often would not be an optical microscope session. For example, the subsequent session could be conducted on an electron microscope in which case a transmission electron microscope (TEM) replaces the optical microscope or a scanning electron microscope (SEM) replaces the optical microscope. (The output of the SEM or TEM is displayed upon a second monitor.) The stage and manual stage controls must be compatible on both the optical and the electron microscopes, however.

It may be desirable to record the subsequent session for later use. To do so, a second video recorder/player 14' with microphone 19' and monitor 15' are required. (See FIG. 1.) The first video recorder used in the playback mode to display images recorded during the first session is stopped where the microscopist has found, by following the lead of the image displayed with the first video recorder/player, a feature that he desires to investigate more fully. For example, a crack may be found and it may be desirable to examine the entire length of the crack. Note is taken, either manually or automatically, of the position of the stage when the playback from the first video recorder is suspended. In this way, the stage can be returned to that position to resume the subsequent examination following the lead of the first examination.

Figure 2:
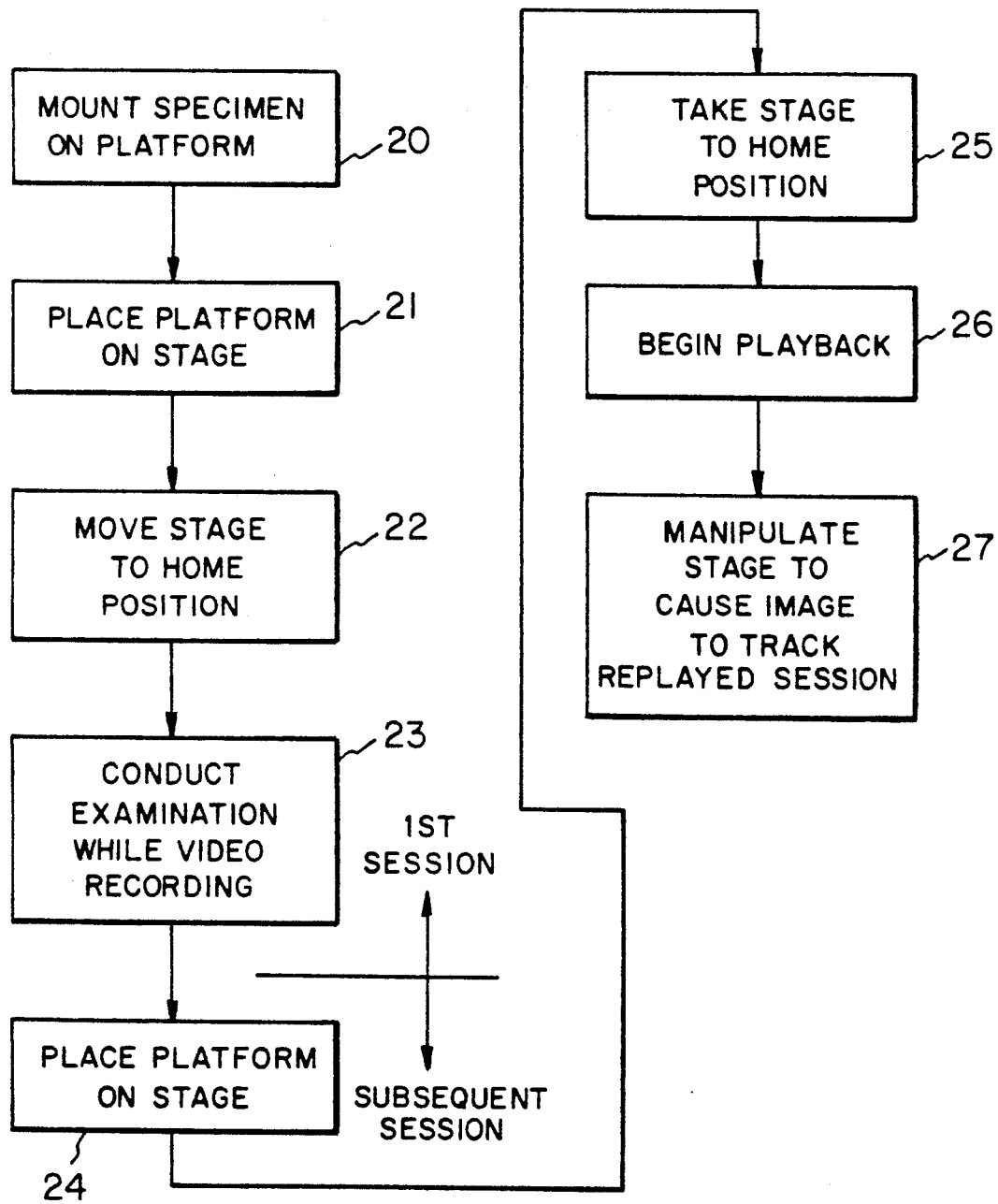
FIG. 2 is a flow chart illustrating the method of practicing this invention with the system shown in FIG. 1.

Referring to FIG. 2, the basic method according to this invention is set forth in a flow diagram. The first step 20 is to mount the specimen on a platform which is sized to snap into a sample platform holder fixed to the microscope stage. The next step 21 is to place the platform into the holder on the specimen stage at the datum position. In the next step 22, the stage is taken to a home position considering all six degrees of freedom.

Now the examination step 23 is conducted. In this step, the microscopist manipulates the stage to examine different fields of view as required by the particular type of examination being made. It should be understood that the systems and methods disclosed herein are not limited to any particular type of microscopic examination. However, the examination might comprise a characterization of the morphology of a construction material (a ceramic, a fiber reinforced plastic, a metal, or concrete, to mention only a few) by viewing a polished section or by viewing a fractured section. The field of view, that is that portion of the specimen that can be observed through the lenses of the microscope at one time, is usually only a small portion of the entire specimen. The microscopist manipulates the stage, the focus and the light applied to the specimen to identify and characterize features (grains, reinforcing fibers, cracks, etc.) on the surface of the specimen. Any one field of view can be photographically or digitally recorded but the single field will only in rare instances of very homogeneous specimens enable characterization of the entire specimen. Hence, the microscopist moves field to field and without this invention must make notes of observations. It would not be practical for the microscopist simply to move the field of view in a regular pattern such as up one straight row and down the other. If, for example, a feature is found that does not fit within one field of view (say a crack) the microscopist may want to follow the feature from end to end no matter where the field of view is taken over the specimen.

According to the embodiment of this invention described with reference to FIG. 2, the entire session or at least the initial portion thereof (following moving the stage to the home position) is recorded by the video camera through the microscope 10b. The microscopist can record his observations orally as the video recorder will record sound at the same time it records video.

The next step according to the method being described is to conduct another examination with reference to the replay of the first examination. The platform carrying the specimen is placed in an identical holder on an identical or compatible stage 24 to begin the subsequent examination. The stage is taken to the home position prior to starting the video tape replay of the prior session 26. Then the stage is manipulated alternately viewing the monitor and the specimen via the microscope. This enables the microscopist to locate features in the second session quite easily that would have been very difficult to locate otherwise. While it is normally difficult at a subsequent session to pick out a feature of a specimen located at a first microscope examination session, it is relatively easy according to this invention to follow the lead of the previously recorded session to the feature by manually adjusting the stage. However, the difficulty may be compounded if a different kind of microscope and/or a different imaging technique is used in the second session.

Figure 3:
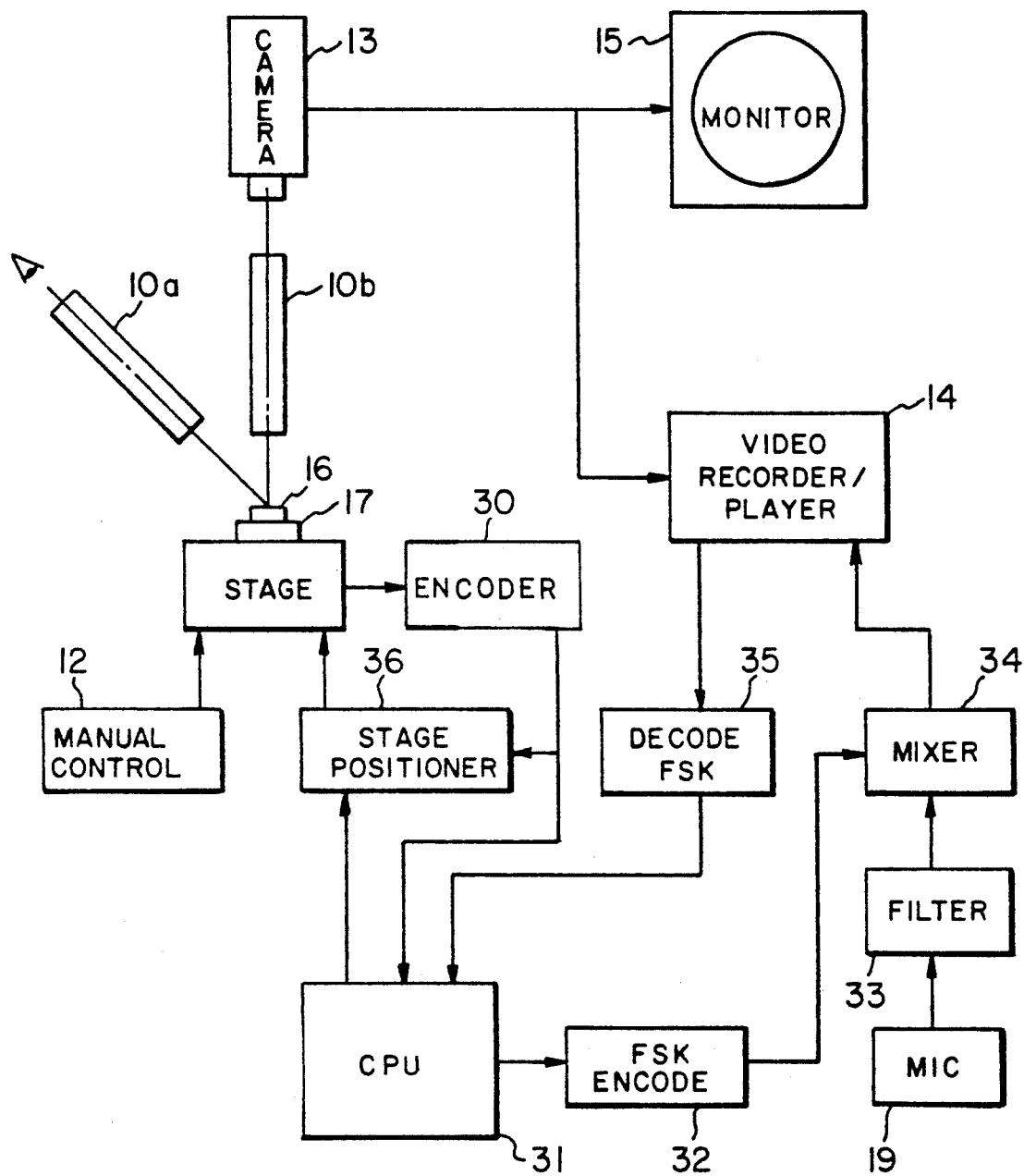
FIG. 3 is a schematic illustration of a system for practice of an embodiment of this invention in which stage position is digitally encoded.
Figure 5:
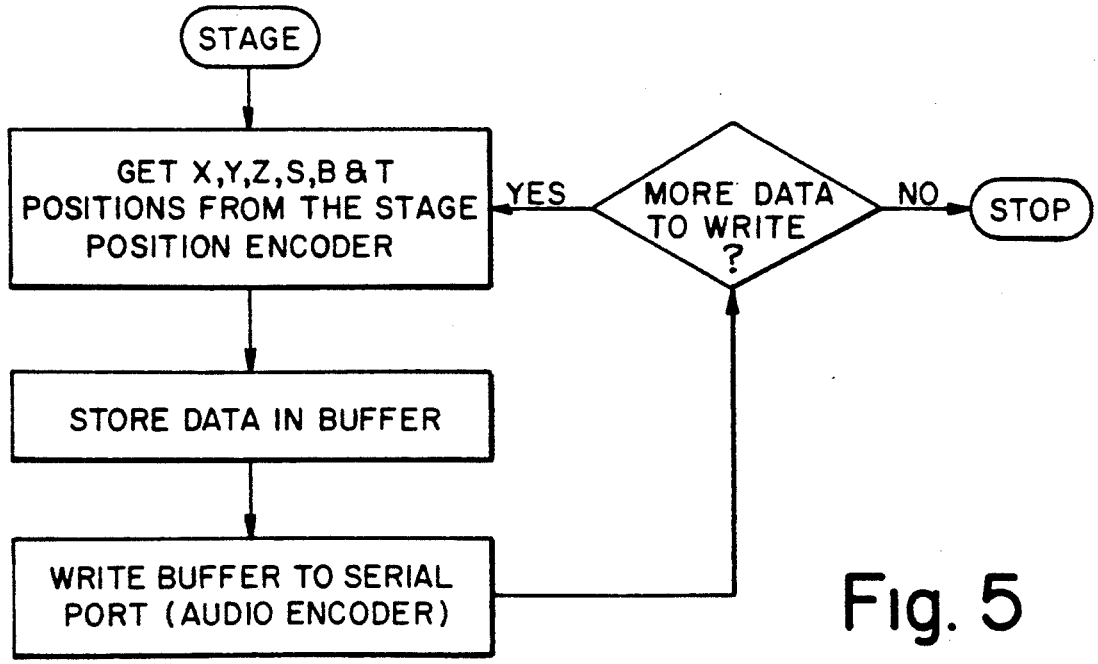

Referring to FIG. 3, there is shown the equipment for the video recording of an optical microscope session in which the stage position is encoded and recorded along with the video images and the oral comments. Corresponding elements numbered 10a through 19 on FIG. 1 are given the same numbers on FIG. 3. In addition, a position encoder 30 is attached to the stage to encode the six degrees of freedom into digital signals. In actual practice, encoder 30 may comprise six encoders, one for each degree of freedom (x, y, z, s, b, t). A computer 31 is programmed to read the encoder and output the encoded positions to a FSK (frequency shift keying) encoder 32 using two frequencies in the upper portion of the audio range recorded by the video recorder. A flow chart for a computer program to read and output the position data is set forth in FIG. 5. The input from the microphone 19 is passed through a low-pass filter 33 to remove the upper frequencies in the audio range. The audio and FSK signals are then combined in mixer 34 and applied to the audio input of the video recorder 14.

Figure 4:
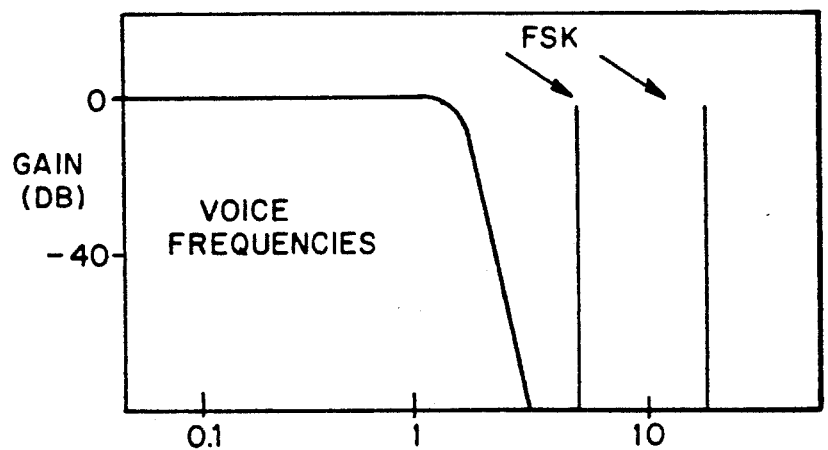
FIG. 4 is a frequency gain diagram for explaining the operation of the system of FIG. 3.

The apparatus described records the position data in standard serial format. For recording both the digital data and orally dictated comments simultaneously on the video tape, the normal analog audio is combined with the serial digital data encoded by FSK techniques in which information is assigned two frequencies in the upper audio range, one for space (zero) and one for mark (one). The gain versus frequency diagram illustrating the filtered audio and FSK frequencies is shown in FIG. 4. The ones and zeros (serial stream protocols that have been developed for computer modem transmission can be used, for example, EIA RS232C Standard) are converted to pulses of the respective frequencies, summed with the analog audio and recorded. A potential problem would be the interference of the analog audio with the FSK signals. This can be handled by setting the FSK frequencies at the high end of the audio spectrum and removing the high end frequencies from the analog voice input. There is only a small component of high frequency data in the human voice.

Figure 6:
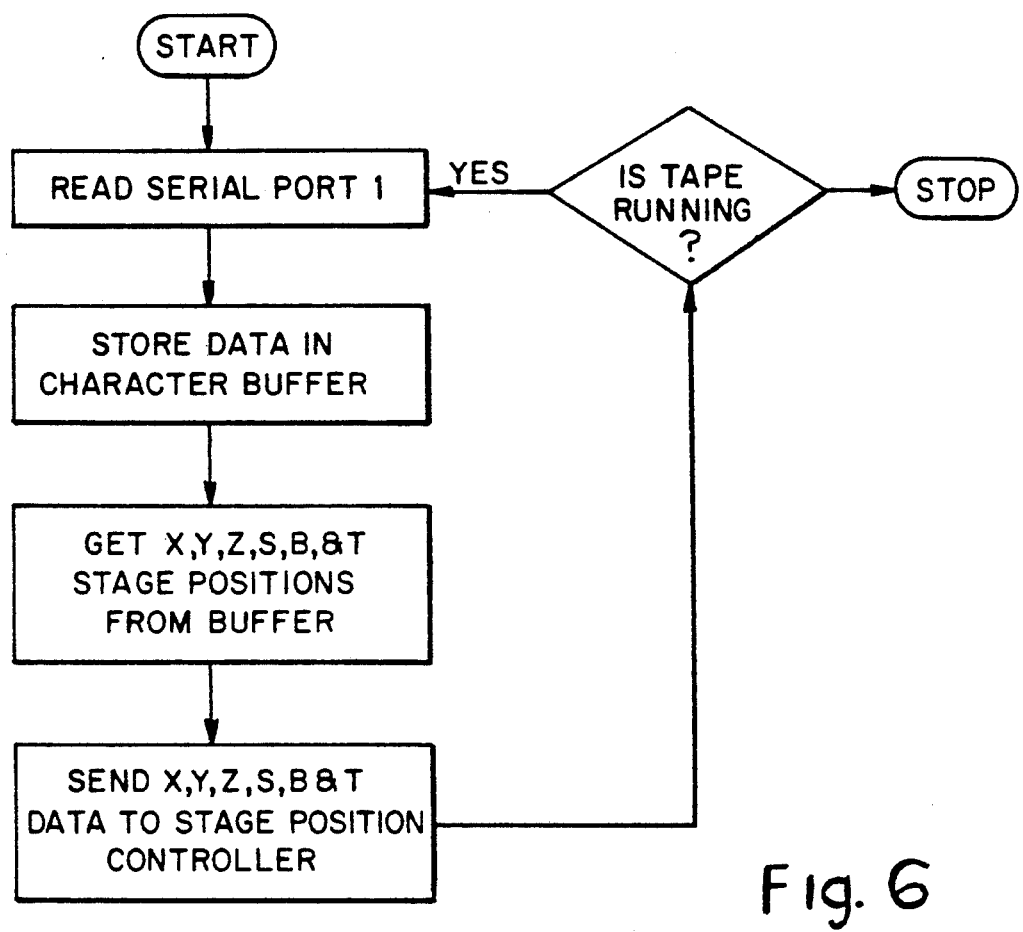
FIGS. 5 and 6 are flow diagrams for computer programs used by the computer shown in FIG. 3.

So far, with reference to FIG. 3, the equipment for video recording a first microscope session has been described. On replay, the FSK signals are decoded by decoder 35. The computer is programmed to read the decoded FSK signals and to output position commands to an automatic stage positioner 36. A flow chart for a program to read the recorded position data and output the data is set forth in FIG. 6. The automatic steps positioner is provided for moving the stage through its six degrees of freedom in response to command signals. The stage positioner may comprise six electric motors for manipulating the stage—one for each degree of freedom. The encoder 30 and stage positioner 36 can be combined in a position feedback control system (servo control system).

For playback, the normal audio signal needs to be separated from the FSK data before it is sent to the speaker. Since the FSK data is in the audio range, it would sound like a high pitch squealing on top of the normal audio. Hence, the audio read from the tape is split into two tracks. One of the tracks is sent through a low-pass filter to remove the FSK frequencies and the other track is sent through a high-pass filter to remove the audio output. The FSK signals may be demodulated using a phase locked loop (PLL) technique. The PLL detects the presence of the two FSK frequencies and recreates the original marks and spaces (ones and zeros) from the recorded serial stream. The speed or the baud rate of the data depends on the speed of the data transfer from the computer while it is being recorded and the speed of the tape while it is being recorded and played back. The baud rate during playback is the same as the rate during recording assuming that the differences in tape speed are negligible. Baud rates of up to 2400 have been achieved with the technique described above.

At a baud rate of 2400, it will take approximately 4 seconds to store a one kilobyte block of data. This is ample for the type and amount of data required to implement the playback and automatic positioning according to this invention. Indeed, a certain amount of additional data may be digitally recorded. For example, X-ray scan data may be recorded amongst the position control data, especially considering that the specimen stage will be held fixed during the collection of the scan data. It would also be possible to record sample identification data, session identification and tape position which would help in locating a particular session in the middle of the tape without the requirement of the user to view the tape from the start to find the desired session. Practically speaking, the user would fast forward to the approximate location on the tape and then let the tape play until the system automatically detects the start of the desired session.

Besides position data from the stage, other adjustments effect the image viewed by the microscopist such as light intensity and focus. It would be possible to encode these as well and to record them along with the position data. Automatic light and focus control could be implemented to be used on playback.

The use of the system described with reference to FIG. 3 is much the same as described above with reference to FIG. 2. The only real difference is that the microscopist does not need to manipulate the manual controls of the stage to track the replayed session. This is performed automatically. Actual practice includes switching between manual and automatic manipulation of secondary stage.

APPLICATIONS

The invention described herein arose from the need to review some 4000 images collected in the course of analyzing a large number of concrete samples. The problem came in trying to redisplay the image data in order to review the results for organizing and summarizing observations. Digitization and computer manipulation of the digitized images was impractical due to the amount of instrument time that would have been involved. Video taping as described herein dramatically improved productivity by permitting on-line discussion and interpretation of what the microscopist was seeing and permitted replay analysis to reexamine for features not originally considered.

An important application of the invention described herein is the correlation of a feature found during an optical microscope session and the same feature viewed with the SEM. While the images produced upon the SEM will not look precisely the same (dark features may appear light and vice versa and other features will appear and disappear), nevertheless there is enough similarity in the replayed optical image and the SEM image to permit the SEM microscopist to easily track the optical image. The hunt and seek techniques previously used resulted in a tedious and time-consuming effort due in part to the differences between the optical and SEM image of the same sample location.

A primary limitation of computer imaging (image digitization) techniques used with optical microscopes is the limited depth of field. Using the video recording methods disclosed herein, the microscopist, by viewing the recorded session and the relation between the stored data and the local sample conditions can sense the depth of field relation.

The sample can be scanned according to the methods of this invention in a systematic fashion to achieve a specific goal. For example, it is often important to measure the dimensions and extent of cracks or inclusions. According to the methods disclosed herein, the operator is permitted to follow a crack with the computer recording the digitized stage location. The digital position data can be captured and used by other computer programs to calculate boundary lengths, feature size, etc.

There exists other applications for the simultaneous recording of digital data and video image data. These include, for example, multimedia presentations wherein in addition to a video tape, other devices such as lights are dimmed and slide projectors are advanced in synchronism with the video playback. The applicants' method is superior to prior methods because it permits the use of standard video recording/playing equipment. For recording and playing, the input and output sound channels are modified, but externally of the standard equipment. The digital data is encoded into the television signal before it is applied to the video recorder and is easily removed and decoded from the analog sound signal.

Having thus defined our invention with the particularity required by the Patent Laws, what is desired to be protected by Letters Patent is set forth in the following claims;

1. Method of making an examination of a specimen by use of a microscope comprising:
   a) mounting the specimen on a standard specimen platform,
   b) during a first session, placing the specimen platform on a specimen stage of the microscope,
   c) moving the specimen stage to a home position,
   d) conducting a microscopic examination of the specimen by moving the specimen by manipulation of the specimen stage while video recording the examination,
   e) during a subsequent session, placing the specimen platform on a specimen stage,
   f) moving the stage to the home position,
   g) displaying the taped image, and
   h) manipulating the stage with reference to the video image so that the image observed by use of the microscope is substantially the same as the video image.

2. The method according to claim 1 wherein the first session is conducted with an optical microscope and the subsequent session is conducted on an electron microscope having a stage compatible with that of the stage on the optical microscope.

3. The method according to claim 1 wherein during the subsequent session, the examination is video recorded and the display of the image of the first session is suspended during manipulation of the stage to observe images not observed during the first session.

4. The method according to claim 3 wherein the stage is returned to the position at which display of the recorded image of the first session was suspended and display of the recorded image of the first session is resumed.

5. Method of making an examination of a specimen by use of a microscope comprising:
   a) mounting the specimen on a standard specimen platform,
   b) during a first session, placing the specimen holder on a specimen stage of the microscope having a position encoder for generating digital signals indicative of position,
   c) moving the specimen stage to a home position,
   d) conducting a microscopic examination of the specimen by moving the specimen by manipulation of the specimen stage while video recording the examination and simultaneously recording the digital position signals in the audio band of the video signal,
   e) during a subsequent session, placing the specimen holder on a specimen stage having a position encoder for generating digital signals indicative of position and servo drive means for moving the stage to a desired position,
   f) moving the stage to a home position,
   g) displaying the recorded video image simultaneously recovering the encoded position data, and
   h) automatically manipulating the stage in response to the recovered position data so that the image observed by use of the microscope is substantially the same as the video image.

6. The method according to claim 5 wherein the first session is conducted with an optical microscope and the subsequent session is conducted on an electron microscope having a stage compatible with that of the stage on the optical microscope.

7. The method according to claim 5 wherein during the subsequent session, the examination is video recorded along with digital position signals and the display of the image of the first session is suspended during manipulation of the stage to observe images not observed during the first session.

8. The method according to claim 7 wherein the stage is returned to the position at which display of the recorded image of the first session was suspended and display of the recorded image of the first session and automatic manipulation of the stage is resumed.

9. The method according to claim 5 wherein the digital data is encoded using FSK techniques.

10. A system for observing microscopic images comprising:
    a) a microscope,
    b) a position encoded microscope stage having encoder means associated therewith for generating signals indicative of the position of the stage,
    c) a video camera for obtaining microscopic video images of the specimen as it is observed by movement of the position encoded stage, and
    d) means to record the microscopic video images and the stage position signals simultaneously with the video images such that stage position signals associated with a given stage position are recorded with an image corresponding to that position.

11. A system according to claim 10 further comprising:
    e) means to drive the stage to commanded positions,
    f) means to replay the recorded video and recover the digital position signals therefrom, and
    g) means to supply the recovered position signals to the stage drive means as command signals.

12. A system according to claim 11 further comprising:
  means for recording an analog voice signal along with the video image,
  means for FSK encoding the stage position signals using two audio frequencies, and
  means for combining the FSK encoded stage position signals with the analog voice signal prior to recording.

* * * * *

UNITED STATES PATENT AND TRADEMARK OFFICE
CERTIFICATE OF CORRECTION

PATENT NO. : 5,216,500

DATED : June 1, 1993

INVENTOR(S) : Michael J. Krummey, Richard J. Lee, James E. Nesbitt, William H. Powers, Jr., and Alfred J. Schwoeble It is certified that error appears in the above-identified patent and that said Letters Patent is hereby corrected as shown below:

Cover page, after [75] Inventors: "William J. Powers, Jr." should read --William H. Powers, Jr.--.

Column 2 Line 12 "arc" should read --are--.

Column 5 Line 47 after "and" insert --to--.

Column 5 Line 48 "steps" should read --stage--.

Signed and Sealed this

First Day of March, 1994

Attest:

BRUCE LEHMAN

Attesting Officer

Commissioner of Patents and Trademarks